Feb. 20, 1940.   R. C. HOYT   2,191,318
TRAILER BRAKE SYSTEM
Filed Nov. 22, 1937   2 Sheets-Sheet 1

Inventor
Roy C. Hoyt
By Chas. C. Reif
Attorney

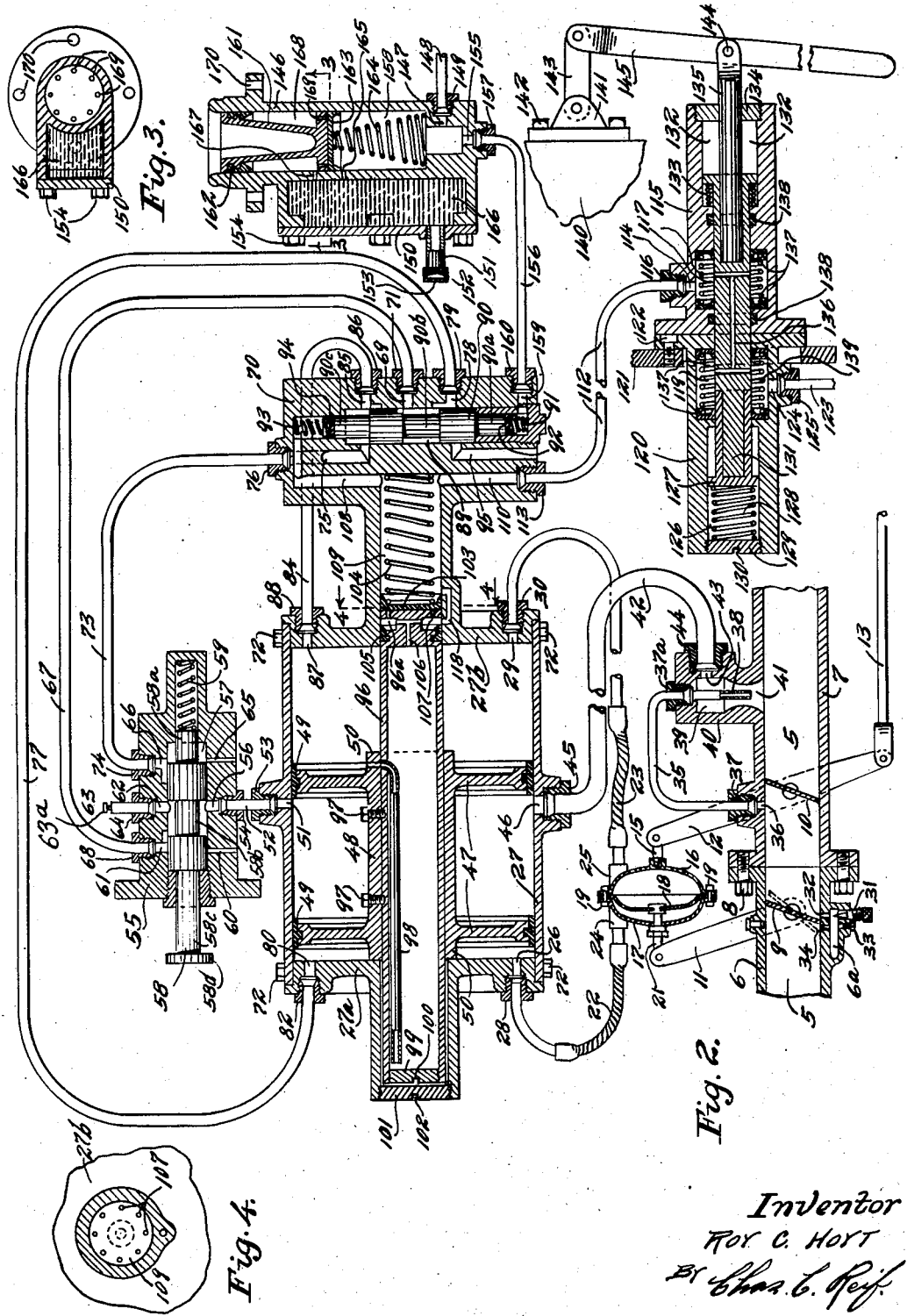

Patented Feb. 20, 1940

2,191,318

UNITED STATES PATENT OFFICE 2,191,318

TRAILER BRAKE SYSTEM

Roy Corwin Hoyt, Duluth, Minn.

Application November 22, 1937, Serial No. 175,811

18 Claims. (Cl. 188—3)

This invention relates to a brake system for vehicles and particularly to a brake system of the hydraulic type. While the invention may have various applications, it particularly is designed as a brake system for operating the brakes on a trailer vehicle by motor actuated power means as for example, the intake manifold of the tractor vehicle motor.

It is an object of this invention to provide a simple, efficient and easily operated brake system for a trailer vehicle and one which may be operated to apply the brakes on the trailer vehicle when the brakes are applied on the tractor vehicle and in which the brakes may be applied to the trailer vehicle independently of the application of brakes to the tractor vehicle.

It is a further object of the invention to automatically accelerate the motor simultaneously with the operation of the brake system either for application or release of the brakes, through the medium of a secondary carburetor system and thereby prevent the motor from missing or stopping due to the dilution of the combustible mixture in the manifold. This increases the efficiency of the vacuum by which the power unit of the brake system is actuated.

It is still another object of the invention to provide efficient conduit coupling means between the tractor and trailer through which the hydraulic brake operations are made without the loss of brake fluid when said coupling means is engaged or disengaged.

It is still a further object of the invention to control and use without loss of power or efficiency through levers or other means, a sufficient quantity of brake fluid to actuate any system of hydraulic brakes to the maximum braking efficiency regardless of how much the brake mechanism is out of adjustment.

It is also an object of the invention to provide a novel structure of manifold including an additional valve placed in the passage leading from the carburetor and a conduit extending from the chamber created between the valves in said passage and leading into the mixing chamber communicating with the manifold together with a conduit extending from said mixing chamber to the brake actuator whereby air drawn through said last mentioned conduit will pass around the end of said last mentioned conduit in said mixing chamber and be efficiently mixed with the mixture issuing from said first mentioned conduit.

It is also an object of the invention to provide a brake system for a trailer vehicle comprising an actuator operated by the application of the atmospheric and reduced pressure thereto through a control device connected to the atmosphere and to the intake manifold of the motor of the tractor vehicle, said control device having means holding it in position with the brakes released but being movable by the operator into position to operate said actuator to apply the brakes.

These and other objects and advantages of the invention will be fully set forth in the following description made in connection with the accompanying drawings in which like reference characters refer to similar parts through the several views and in which:

Fig. 2 is a view in central vertical section through said parts;

Fig. 3 is a horizontal section taken on line 3—3 of Fig. 2; as indicated by the arrows, and Fig. 4 is a vertical section taken on line 4—4 of Fig. 2, as indicated by the arrows.

Figure 1:
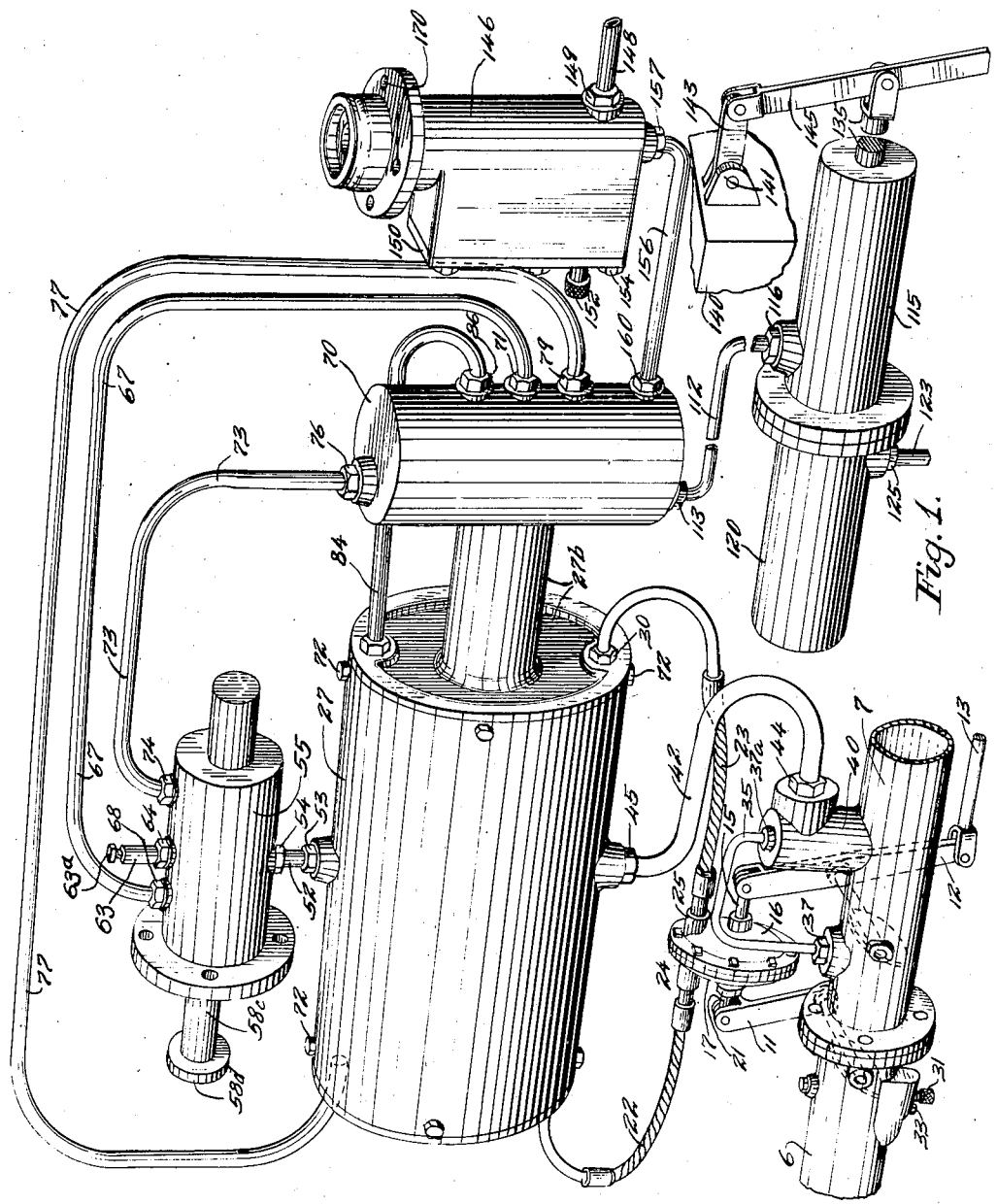
Fig. 1 is a perspective view of the various parts forming the brake system of the present invention.

Referring to the drawings, a brake system or mechanism for a trailer vehicle is shown. As stated, a novel structure of manifold is used with this system. The mixing chamber or passage of a carburetor is shown as 5 contained within a carburetor member or casting 6. Said casting 6 has a flange at one end connected to a flange on the manifold riser 7 by cap screws 8 which, as shown, pass through one of said flanges and are threaded into the other. The passage 5 continues through member 7 and this is the passage which conveys the gas issuing from the carburetor to the motor. In accordance with the present invention two shutter valves 9 and 10 respectively are provided and disposed within said passage having trunnions or bearings provided in the castings 5 and 7. Control levers 11 and 12 are secured respectively to the trunnions of said valves 9 and 10. Lever 12 extends to both sides of its connection to valve 10 and has pivotally connected to one end thereof a rod 13 forming the connecting rod to the accelerator mechanism. The other end of lever 12 is pivotally connected to a connecting rod 15, said rod being screw threaded at its other end into a casting 16 forming substantially half of a diaphragm control pot. The other half or part of said control pot is formed by a casting 17, said casting having flanges secured by the headed and nutted bolts 19. A diaphragm 18 has its edge clamped between said flanges and extends across the chamber in said pot which as shown in Fig. 2 is substantially ellipsoidal in form. Diaphragm 18 has connected thereto substantially at its center a connecting rod 21 passing through a packing member 12 carried by casting 17, said rod being pivotally connected at its other end to the end of lever 11. A flexible conduit 22 is coupled or connected to a boss 24 on casting 17 and is connected at its other end by a screw threaded and flanged coupling 28 to the upper or left hand end casting 27a of a cylinder 27 so as to communicate with the pot 26 in said end casting. Another flexible conduit 23 is secured or coupled at one end to a boss 25 on the casting 16 and connected at its other end by the flanged and threaded coupling member 30 to the lower or right hand end member 27b of cylinder 27 so as to communicate with a port 29 in said end member. It will thus be seen that communication is afforded from opposite ends of cylinder 27 to the said diaphragm pot formed by members 16 and 17 at both sides of diaphragm 18 respectively. A jet-forming opening 32 is shown as extending through the wall of member 6 from a chamber 6a adjacent thereto and a valve 31 is provided threaded into the wall of chamber 6a and having a pointed end cooperating with opening 32 to regulate the amount of gasoline issuing therethrough. Another opening or orifice 34 is provided closely adjacent orifice 32 and a plug 33 is threaded into an opening in the wall of chamber 6a in alignment with orifice 34, said latter opening forming a cleanout passage. In the decelerated position of the shutter valves 9 and 10 valve 9 assumes a closed position between the idling jet openings 32 and 34. Valve 10 is thus completely closed. The idling mixture supplied from the carburetor is trapped in the chamber or portion of passage 5 between the valves 9 and 10. A conduit 35 is connected at one end by the threaded and flanged coupling 37 to member 7 so as to communicate with chamber 5 through a port 36 disposed between valves 9 and 10. The other end of conduit 35 is connected by a threaded and flanged coupling 37a to an enlarged portion 40 of manifold casting 7 having therein a chamber 39 opening into passage 5 of member 7 through the Venturi tube portion 41. A nozzle 38 is aligned with and communicates with conduit 35 and has its end disposed centrally of the Venturi tube portion 41. A conduit 42 of considerably larger size than conduit 35 is connected by a threaded and flanged coupling member 44 to one of the enlarged portions 40 so as to communicate with the port 43 leading into the chamber 39. The other end of conduit 42 is connected by a threaded and flanged coupling member 45 to a boss on the side of the cylinder 27 so as to communicate with the port 46 leading into said cylinder. It will be seen that an automatic accelerator medium is provided between the control levers 11 and 12 operated by the atmospheric pressure and reduced pressure produced in the diaphram control pot through the flexible conduits 22 and 23.

Cylinder 27 has movable therein pistons 47 rigidly connected by a sleeve 48, said pistons having peripheral packing rings 49 thereon engaging the wall of cylinder 27. Hubs 50 project at the remote sides of pistons 47 and form stops adapted to engage end members 27a and 27b to properly position the pistons at certain times in the operation thereof. These stops also insure that ports 46 and 51 will communicate with the chamber formed between said pistons at all times, which chamber forms an auxiliary reservoir.

A conduit 52 is connected at one end by a threaded and flanged coupling 53 to a boss on the side of cylinder 27 so as to communicate with said cylinder through a port 51. Said conduit 52 is connected at its other end by a threaded and flanged coupling 54 to a valve body casting 55 so as to communicate with the cylinder formed by the bore 57 of said casting through a port 56.

Cylinder 57 has quite a number of ports, six in number, immediate communicating therewith adapted to cooperate in pairs with a valve core 58 slidable in cylinder 57. Member 58 has reduced portions 58a, 58b and 58c thereon and as shown in Fig. 2, it will be seen that these portions provide separate valve chambers in cylinder 57. A coiled compression spring 59 has one end seated in the end of a bore in casting 55 and its other end bearing against one end of valve core 58. Spring 59 holds valve core 58 in the position shown in Fig. 2 which is the released position, at which time the left hand large portion of said core is in the left hand end of cylinder 57. Member 55 has ports 60 and 65 at one side leading from cylinder 57 to the atmosphere. Member 55 has a port 62 leading centrally from cylinder 57 to which is connected by the threaded and flanged coupling 64 a conduit 63. This conduit is merely provided for some auxiliary connection or service and is otherwise normally closed by a plug 63a. In the released position of member 58 will be noted that port 60 to the atmosphere is closed while port 65 to the atmosphere is open and communication is afforded between this port and a port 66 in member 55. Port 66 is at one side of port 62 and another port 61 is spaced from port 62 at the other side thereof. A conduit 67 has one end connected by the threaded and flanged coupling 68 to member 65 so as to communicate with port 61 and has its other end connected by a threaded and flanged coupling 71 to one side of a control member or valve body casting 70 illustrated as formed integrally with the end casting 27b of cylinder 27. Conduit 67 communicates with a port 69 leading into a cylinder 89 formed by the bore in member 70. It may be pointed out that cylinder 27 is secured to the end members 27a and 27b by the cap screws 72. A conduit 77 has one end connected to cylinder end member 27a by a threaded and flanged coupling member 82 so as to communicate with cylinder 27 through a port 80. Conduit 77 is connected at its other end by a threaded and flanged coupling member 79 to member 70 so as to communicate with cylinder 89 through a port 78. A conduit 73 is connected by a threaded and flanged coupling member 74 to member 55 so as to communicate with port 66 and is connected at its other end by a threaded and flanged coupling member 76 to one end of member 70 so as to communicate with a port or passage 75 in member 70, said port leading into cylinder 89 and as illustrated, substantially opposite port 85 to be later described. A conduit 84 is connected at one end by the threaded and flanged coupling 88 to end member 27b of cylinder 27 so as to communicate with said cylinder through a port 87 and said conduit is connected at its other end by a threaded and flanged coupling 86 to the member 70 so as to communicate with cylinder 89 through port 85.

The valve structure in member 70 is similar to that in the member 55 in that there is a cylinder with ports cooperating in pairs through the function of a valve member or valve core. In the member 70 the valve core or member is shown as 90, the same fitting slidably in cylinder 89 and having reduced portions 90a, 90b and 90c respectively. A compression coiled spring 91 has one end engaging the bottom of a reduced bore in the lower end of the cylinder 89 and the same has its other end engaging a cup sealing member 92 disposed against the lower end of member 90. Said member 92 has a peripheral flange directed away from member 90. A compression coiled spring 93 has one end engaging the top of a reduced bore at the upper end of cylinder 89 and said spring has its other end engaging a cup sealing member 94 which engages the top of member 90. Member 94 also has a peripheral flange at one side directed away from member 90. The spring 93 is of greater strength than the spring 91 and normally holds the member 90 in its lower position which is the released position of the brake mechanism. Member 70 has a port or passage 95 communicating with the lower end of cylinder 89 and extending to the atmosphere. When member 90 is in its lower or released position as shown in Fig. 2, member 90 closes off port 95 from the adjacent or cooperating port 78.

The hub 48 connecting pistons 47 in cylinder 27 is bored to receive a hollow piston 96 secured in said hub with a press fit and also held therein by set screws 97. A vent tube 98 is disposed in piston 96 extending adjacent one wall thereof and having one end secured therein and communicating with cylinder 27 through an aperture in one of the hubs 50. The other end of vent tube 20 is adjacent the upper or left hand end of piston 96. The end of piston 96 is closed by a plug 99 threaded into the end of said piston, the same being shown as having a transverse groove 100 therein at its outer side for the application of a tool for its removal. A similar plug 101 is threaded into the projecting cylindrical hub of end member 27a of cylinder 27 and the same has a transverse groove 102 at its outer side adapted to receive a tool for its removal. The chamber in piston 96 forms a brake fluid reservoir. The right hand or lower end of piston 96 is engaged at its outer side by a sealing cup member 103 which may be made of rubber or leather. Said cup member has a peripheral flange directed away from piston 96 and engaging the wall of the cylinder or bore 109 in the portion connecting member 70 and end member 27b. Cup member 103 is held in place by a coiled compression spring 104, one end of which engages member 103 within the flange thereof and the other end of which engages the end of said cylinder in which it is disposed. Spring 104 holds piston 96 in the position shown in Fig. 2 which is the released position of the brake mechanism. A sealing ring 105 is fitted in an annular groove in the periphery of piston 96 adjacent the end thereof which acts to prevent brake fluid from passing from cylinder 109 into cylinder 27. A groove or chamber 96a is formed about piston 96 between cup members 103 and 105 which chamber communicates with the interior of piston 96 through the port or passage 106. The lower or right hand end of the piston 96 is closely fitted to the wall of cylinder 109 and the same has a plurality of small holes 107 extending from groove 96a to the end of the piston and the cup member 103. The passage 108 is provided in member 70 at one side of port 75 and extends to the upper reduced portion of cylinder 89 which contains the spring 93. Said passage 108 is separate from passage 75. A bypass portion or passage 118 extends from cylinder 109 at spaced points to provide a passage for brake fluid from cylinder 109 to the groove 96a. A passage 110 extends through member 70 from cylinder 109 to the lower end of member 70 and communicates with a flexible conduit 112, one end of which is secured to member 70 by a threaded and flanged coupling member 113. The other end of conduit 112 is connected by a threaded and flanged coupling member 116 to a boss on a tractor-carried coupling casting 115. Member 115 has formed therein a chamber 117 forming a fluid pressure chamber and cylinder or fluid chamber 109 is thus in communication with this pressure chamber through conduit 112. A similar coupling casting 120 is provided which will be mounted on the trailer unit a portion of which is shown by the plate 121. Casting 120 extending through an opening in plate 121 and having a flange connected to said plate by the screws 122. Casting 120 has formed therein a pressure chamber 119 similar to chamber 117. A conduit 123 is connected to a boss on member 120 by a threaded and flanged coupling member 125, said conduit communicating through a port 139 with chamber 119. Conduit 123 will be connected to the brake cylinders of the trailer unit. The coupler casting 120 is bored at one end to provide a cylinder 126 in which a sleeve valve 127 fits and slides. A compression coiled spring 128 is disposed in cylinder 126 having one end engaging valve 127 and its other end engaging a plug 129 threaded into the end of member 120 and closing cylinder 126. Plug 129 is provided with a transverse groove 130 adapted to receive a tool for removing said plug. A valve member or core 131 has one end fitted in and secured to valve 127 as shown in Fig. 2. A coupler casting 115 which is carried on the tractor is also bored at one end to provide a cylinder 132 and valve member 131 has a flange at one end fitted to reciprocate in cylinder 132. A coiled compression spring 133 surrounds valve 131 having one end bearing against the inner side of the flange thereon and its other end engaging member 115 at the end of cylinder 132. Springs 126 and 133 thus act to urge valve member 131 to the right as seen in Fig. 2. Cylinder 132 is closed at one end by a plug 134 threaded therein, which plug is bored coaxially with cylinder 32 to form a bearing for a coupling valve stem 135. Valve stem 135 extends into and is secured to one end of valve 131. Centrally located in the valve core or valve member 131 is a passage 136 extending axially of said member and having passages at its end which extend radially to the outer side of member 131. Passage 136 forms a conduit coupling provision providing brake fluid communication between the pressure chamber 119 in the trailer coupler casting 120 and the pressure chamber 117 in the tractor coupler casting 115. This provision enables the brake fluid to be transmitted by a bore operated master cylinder to the brake cylinders of the trailer unit through conduit 123. The member 131 is sealed by cup members 137 disposed at the ends of chambers 117 and 119 respectively, the same having peripheral flanges facing each other and having flanges surrounding and engaging member 131. A pair of annular grooves are formed in member 113 about the bore receiving member 131, which grooves have disposed therein sealing rings 138 which will be made of rubber or similar suitable material. At certain times the radial passages from passage 136 align with packing rings 138 and thereby prevent the brake fluid from leaking out when the coupler castings are disengaged.

A portion of the trailer unit is indicated as 140 and the same has secured thereto by the cap screws 142 a bracket 141. A link 143 is pivotally connected at one end to brake 141 and pivotally connected at its other end to cone end of a lever 145, said lever being pivoted by pivot 144 to the outer end of valve stem 135. Lever 145 and attached parts thus constitutes a lever mechanism enabling an operator to compress springs 133 and 128 during the coupling operation. A locking means (not shown) of any suitable type will be disposed on the trailer unit to hold the conduit coupling means engaged and this will engage the end of lever 145.

A master cylinder casting 146 is shown, this being of the conventional type of such a cylinder for operating a brake mechanism. Said cylinder has an outlet port 147 with which communicates a brake fluid conduit 148 secured to said cylinder by a threaded and flanged coupling member 149. Conduit 148 will extend to the brake cylinders of the tractor vehicle. Member 146 is shown as having projecting from one side thereof parts forming a chamber 166 to which parts is secured a cover 150 for said chamber by means of cap screws 154. Cover 150 has threaded into a boss thereon a filler tube 151 shown as having thereon a knurled closing cap 152. A vent opening 153 will be provided in the top of cap 152 for chamber 166 so that atmospheric pressure will be maintained therein. A port 155 also leads from the chamber 158 in member 146 and a conduit 156 communicates with said port, the same being secured at one end to member 146 by a threaded and flanged coupling member 157. Said conduit is connected at its other end to member 70 by a threaded and flanged coupling member 160 so as to communicate with cylinder 89 through a port 159. Communication is thus provided for a brake fluid to pass from chamber 158 of the master cylinder to the reduced bottom portion of bore or cylinder 89. A piston 161 is disposed in cylinder 158, the same having a pressure sealing cup member 163 at its lower end, said cup having a peripheral flange directed away from said piston. A tapered coiled compression spring 164 has its larger end engaging the bottom of chamber 158 and its upper and smaller end engaging the central portion of cup 163. Spring 164 has sufficient strength to normally move piston 161 to its released position when the pedal assembly or operating assembly (not shown) for piston 161 is not in operation. A bypass port 165 connects the brake fluid chamber or reservoir 166 to the cylinder 158 just below or in front of piston 161 or its cup member 163 when in release or inoperative position. A port 167 provides communication from brake fluid chamber 166 to chamber 168 above sealing member 163 and the lower-end of piston 161. Piston 161 has another sealing cup member 162 surrounding the same spaced from and above cap member 163, member 162 also having a peripheral flange engaging the wall of cylinder 158 and directed toward the end of said piston which engages member 163. Chamber 166 will, as above stated, have a vent passage therein so that chamber 168 between members 162 and 163 will at all times be kept at atmospheric pressure through the port 167. A plurality of small holes 169 extend from chamber 168 through the flange or end of piston 161 to the inner side of cup member 163. Member 146 is shown as having a flange surrounding the same adjacent its top to receive bolts for attaching said member to a suitable support.

It is pointed out that in the brake system disclosed a fluid brake mechanism of the conventional character applied by a pedal or other mechanism (not shown) is operated in a reciprocating balance with a power actuated fluid operated brake mechanism through the medium of a reciprocating valve or mechanism which controls the power medium.

It will be seen that no vacuum is indicated in the drawings and as above stated, the various ports operated by the vacuum or reduced pressure and by atmospheric pressure are shown in their reciprocable positions of release. The positions of release is of course, the position occupied by the ports when the brakes are not applied. The vacuum or reduced pressure will extend to all of the conduits communicating with the manifold by means of which the reduced pressure or vacuum is produced. The atmospheric pressure will, of course extend to all parts in communication with the atmosphere. Whereas no fluid for the most part is indicated in the drawing, it will be understood and assumed that all of the brake fluid chambers or conduits receiving the fluid are full of the braking fluid and that no actuating pressure is being applied to the fluid in the showing in Fig. 2. The elements in said brake fluid chambers are also shown in release position.

In accordance with synchronized movement of the piston assembly in cylinder 27 the diaphragm 18 is indicated in its extreme position of release which holds the shutter valve 9 in its decelerated position between the idling jet orifices 32 and 34. By this provision gas issuing from jet 32 will constitute the gas portion of the idling mixture which in accordance with the invention is trapped by the additional shutter valve 10. This valve is connected to the diaphragm control pot casting member 16 by the lever 12 and connecting rod 15. The idling mixture thus trapped is communicated through the conduit 35 to the nozzle 38 which is disposed in proper position centrally of the Venturi tube 41 to provide maximum carburation on the release cycle or in the released position of the brakes.

Assuming that the idling effect of the tractor vehicle is producing a movement through passage 5 the vacuum will communicate with the mixing chamber 39 through the Venturi tube 41 and through port 43, the conduit 42 and port 46 to the chamber between the pistons 47.

This vacuum or reduced pressure is constantly maintained in cylinder 27 between pistons 47 and this is communicated at all times through conduit 52 to the valve chamber at the center of valve core or member 58. With the member 58 in its position at the left hand end or top of cylinder 57, said valve member shuts off the atmosphere through port 60. The vacuum is shut off from port 66 which is in communication with the atmosphere through port 65. It is seen that valve 58 is thus maintained in its release position as shown in Fig. 2. The reduced pressure is communicated through port 61, conduit 67, port 69 and cylinder 89 between the large or non-reduced portions of valve core or member 90, thence to port 78, conduit 77 and port 80 to cylinder 27 at the left hand end or the upper ends of piston 47 at the left or upper end of cylinder 27. At the same time atmospheric pressure is communicated through port 66, conduit 73, port 75 to cylinder 89 about reduced portion 90c of valve core member 90 and thence through the port 85, conduit 84 and port 87 to cylinder 27 at the right hand side of lower or right hand piston 47. With this condition it is apparent that pistons 47 are maintained at the upper or left hand side of cylinder 27 and that valve core or member 58 is maintained in the position shown at the left of cylinder 57 which as stated is the release position. As above stated, spring 93 is stronger than the spring 91 and holds the valve core member 90 in the release position as shown in Fig. 2. Atmospheric pressure which is present in port 95 at all times is thus shut off from port 78 by the lower large or unreduced portion of member 90. The upper large or unreduced portion of member 90 prevents the vacuum from being communicated to ports 75 or 85. As already described, atmospheric pressure is delivered through these ports and member 90 is thus held in its release position as shown in Fig. 2.

As stated, when the trailer coupling members 115 or 120 are in position the lever 145 will occupy the position shown in Fig. 2 and will be locked in this position. When the operator moves piston 161 in cylinder 158 by the usual pedal or other brake applying mechanism, a fluid pressure will be created in cylinder 158 sufficient to operate the actuating pistons in the wheel brake cylinders (not shown) of the tractor vehicle through conduit 148. Because a spring is arranged in retraction capacity across the brake elements approximately 50 pounds of fluid pressure is ordinarily required prior to 50 pounds of fluid pressure being established in the master cylinder.

When the piston 161 is operated as described the fluid pressure created in chamber 158 is transmitted through conduit 156 and port 159 to the lower reduced end of cylinder 89 and applied against the lower end of valve member or core 90. Said member 90 is thus forced upward compressing spring 93 and said member moved upward until the upper large or unreduced portion engages the upper end of the cylinder 89. When member 90 thus moves upward port 75 is shut off from port 85 and port 78 is cut off from port 69. Reduced pressure is still maintained between the pistons 47 and this reduced pressure or vacuum is now transmitted through port 51, conduit 52 the chamber in cylinder 57 about reduced portion 58b of valve 58, through port 61 and conduit 67 to port 69. With member 90 moved upwardly as described, port 69 will be put into communication with port 85 by the chamber about reduced portion 90b of member 90. Vacuum will thus be transmitted through said port 85 and conduit 84 through port 87 to cylinder 27 at the lower or right hand side of the lower or right hand piston 47. At the same time atmospheric pressure will be transmitted from port or passage 95 to the chamber in cylinder 89 about the reduced portion 90a of member 90 through port 78 and conduit 77 and through port 80 to cylinder 27 at the upper or left hand side of the upper or left hand piston 47. The vacuum or reduced pressure is thus now applied to the right hand end of cylinder 27 while atmospheric pressure is transmitted to the left hand or upper end thereof and pistons 47 are accordingly caused to move to the right. The application cycle of the upper actuated mechanism is thus accomplished and when pistons 47 move to the right as shown in Fig. 2 piston 96 is moved in cylinder 109. It will be understood that cylinder 109 is filled with brake fluid. Movement of piston 96 creates pressure on the brake fluid and this pressure is transmitted through passage 110, conduit 112 and through port 114 to the pressure chamber 117. The pressure is then transmitted through the fluid in the conduit coupling provision formed by passages 136 and thus transmitted to pressure chamber 119. From chamber 119 the pressure is transmitted through port 124 and conduit 123 to the trailer brake wheel cylinders and the brakes will be applied to the trailer.

When pressure is created in cylinder 109 as described, this is transmitted through passage 108 to the reduced upper end of cylinder 89 above valve member or core 90 and the pressure thus applied to said member causes the same to move downwardly to a position of lap. In this position communication between the cooperating ports is shut off and a balance is established between the foot applied brake pressure and the power applied brake pressure. The fluid pressure created through the power actuated mechanism will then not increase or decrease except by control of the operator.

The release cycle of the mechanism takes place when the pressure is released on piston 161 which has been applied by the pedal or other mechanism. When this occurs the brake fluid pressure in cylinder 158 will simultaneously reduce to atmospheric pressure through port 165 which as stated, is in communication with atmospheric pressure on the brake fluid in reservoir 166. Valve member or core 90 will at once then move to its position of release shown in Fig. 2 by the action of spring 93. When member 90 moves to this position the vacuum and pressure will be applied as already described so that the pistons 47 will be moved to the left or top portion of cylinder 27 to the position shown in Fig. 2. The ports are thus returned to release position.

On the power actuated release stroke of the piston assembly in cylinder 27, that is when pistons 47 move to the left as shown in Fig. 2, the piston rod 96 will also be moved to the left and to its position of release as shown in Fig. 2 and this will take place before the piston assembly in the wheel cylinders of the trailer unit are fully moved to the position of release and thus before all of the fluid is discharged from said cylinders. This condition is compensated for by brake fluid in the reservoir or chamber within piston 96 passing through port 106 into the annular chamber 96a and thence through bypass 118. The flange on cup member 103 in the retraction of piston 96 will be disposed contrary to its sealing tendency. Brake fluid will also pass through holes 107 in the end of piston 96 into the fluid chamber 109. The chamber 109 can thus fill with brake fluid before the trailer wheel cylinder assembly is fully released, and before all of the brake fluid is discharged from said assembly. Fluid can subsequently pass through bypass 118 back into the piston 96. Atmospheric pressure is in communication with the left hand end portion of the brake fluid reservoir within piston 96 on its release movement through the vent tube 98.

The brakes can also be applied on the trailer by operation of valve member or core 58. Said member has an actuating flange 58d at its outer end and this can be actuated by the operator either directly or through any desired mechanism. When member 58 is thus moved it moves to the right as shown in Fig. 2 and spring 59 is compressed. The right hand large portion of the valve moves to the end of cylinder 57. When in this position the vacuum which as stated, is always common to port 56 will be communicated through the chamber in cylinder 57 about reduced portion 58b to port 66 and thence through conduit 73 to port 75 in member 70 and through the chamber in cylinder 89 about the reduced portion 90c to port 85 then through conduit 84 and port 87 into the right hand end or lower end of cylinder 27. At the same time atmospheric pressure through port 60 will be communicated in chamber 57 about the reduced portion 58c of member 58 to port 61 and thence through conduit 67 and port 71 to the chamber in cylinder 89 about reduced portion 90b and from said chamber through port 78, conduit 77 and port 80 to the upper or left hand end of cylinder 27 at the left hand side of the upper or left hand piston 47. Reduced pressure is thus at the right of pistons 47 and atmospheric pressure at the left so that said pistons will again be moved to the right, thus moving piston 96 creating pressure on the brake fluid in chamber 109. Atmospheric pressure in the left hand end or upper end of cylinder 27 will also communicate through port 26, the conduit 27 and through the boss 24 to the left hand side of diaphragm 18 in the control pot formed by members 16 and 17.

Upon pressure being relieved on port 58d of member 58 the released spring 59 will return valve member or core 58 to its position of release shown in Fig. 2 and this will cause all of the ports in member 55 to register as shown. This will again put vacuum or reduced pressure into the left hand or upper end of the cylinder 27 and atmospheric pressure into the right hand end of pistons 47 and piston 96 will be moved back to the release position shown in Fig. 2. The atmospheric pressure and reduced pressure will also be reversed in the control pot formed by members 16 and 17 and diaphragm 18 will be moved to the position shown in Fig. 2. It will thus be seen that the brakes can be set on the trailer independently of the operation of the brakes on the tractor vehicle.

It will be understood that shutter valve 9 in the passage is shown in the normal idling position with the brakes in the release position. When vacuum is applied to the right hand or lower end of the cylinder 27 it is also communicated through conduit 23 to the right hand side of the pot formed by members 16 and 17. This moves diaphragm 18 to the right as shown in Fig. 2 thus moving rod 17 and swinging lever 11. This moves shutter valve 9 to the dotted line position shown in Fig. 2 and this cuts in jet orifice 34 thus supplying more fuel to the motor. This accelerates the motor and insures that there will be ample vacuum or power for operating the pistons 47 and applying the brakes. The motor is thus automatically accelerated in the application cycle of the mechanism. The motor, of course, can be accelerated as usual and connecting rod 13 will then be swung moving valve 10 to open position and also moving valve 9 through parts 15, 16, 17, 21 and 11.

Due to the relative areas of pistons 161 and 90 the latter will be moved to its maximum upward position as shown in Fig. 2 so that the brakes will be applied on the trailer before the fluid acts by movement of piston 161 to set the brakes on the tractor vehicle. This is an important feature as it is very desirable to set the brakes on the trailer vehicle first. This prevents additional movement of the trailer after the tractor is retarded and thus prevents jackknifing of the trailer or in other words, a swinging movement of the rear end of the trailer laterally and forwardly.

To disengage the coupling means between the tractor and trailer namely members 120 and 115 the locking means (not shown) for the lever 145 is released. The valve stem 135 can then be removed from its cooperating member 131. There will be a removable connection between these parts. The lever locking means remains on the trailer unit. The tractor-carried portion of the mechanism contained in the coupling casting 115 is disconnected from the trailer portion contained in the member 120. In this disengaging operation the compression springs 113 and 128 move the valve member or core 131 to the limit of its disconnecting position and at this time the radial portions of passage 136 will be in alignment with the sealing rings 128 so that there will be no leakage of brake fluid. The portion 127 moves with the member 131. Member 131 will move until its flanged end engages the plug 134. The chambers 117 and 119 are sealed against fluid losses by the sealing cup member 137.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A brake system for a trailer vehicle adapted to be operated from an automotive tractor vehicle, comprising, a fluid pressure cylinder, a conduit leading from said cylinder to the brake system of said trailer vehicle for conducting fluid under pressure thereto to apply the brakes to said trailer vehicle, a plunger movable in said cylinder, a control device, a plunger actuating means, means for holding said control device in position with atmospheric pressure and reduced pressure applied to said plunger actuating means to hold said plunger in brake releasing position, means for operating said control device to reverse the application of atmospheric pressure and reduced pressure to said plunger actuating means for operating said plunger actuating means and moving said plunger to brake applying position to force fluid through said conduit and apply the brakes to said trailer.

2. The structure set forth in claim 1, said plunger having a fluid containing chamber therein and having a small passage through its end disposed in said fluid pressure cylinder through which fluid may pass from said cylinder into said chamber.

3. The structure set forth in claim 1, said plunger having a chamber therein for containing fluid, said chamber communicating through a small passage with said cylinder and a vent pipe extending through the side of said plunger to adjacent the end thereof opposite said cylinder.

4. A brake system for a trailer vehicle adapted to be operated from an automotive tractor vehicle having a fluid operated brake system, comprising, a fluid pressure cylinder, a plunger movable therein, a conduit leading from said cylinder to the brake mechanism of said trailer for conducting fluid under pressure to said mechanism for applying the brakes, a plunger actuating device, a control device, a second control device, a connection from the intake manifold of said automotive vehicle to said control devices, means for holding said control devices in position with atmospheric pressure and reduced pressure applied to said plunger actuating means for holding said plunger in brake releasing position, means actuated by the brake applying means of said automotive vehicle for operating said second control device to reverse the application of atmospheric and reduced pressure to said plunger actuating device to move said plunger and force fluid through said conduit to apply the brakes on said trailer when the brakes on said automotive vehicle are applied, means for operating said first mentioned control device to reverse the application of atmospheric and reduced pressure to said plunger actuating means to move said plunger to apply the brakes on said trailer without applying the brakes on said automotive vehicle.

5. A brake system for a trailer vehicle adapted to be operated from an automotive tractor vehicle, comprising, a power cylinder having closed ends, spaced pistons therein connected to move in unison, a fluid pressure cylinder at one end of said first mentioned cylinder, a plunger movable in said latter cylinder and connected to said pistons to be moved thereby, a conduit extending from said pressure cylinder to the brake system of said trailer vehicle, means for applying atmospheric pressure to one end of said power cylinder and reduced pressure to the other end thereof to hold said plunger in brake releasing position and means operated by the brake applying means of said automotive vehicle for placing atmospheric pressure on said other end of said power cylinder and reduced pressure on said one end of said power cylinder to move said plunger to supply fluid under pressure to said first mentioned conduit and apply the brakes to said trailer vehicle.

6. The structure set forth in claim 5, said plunger being disposed in and centrally of said power cylinder.

7. A brake system for a trailer vehicle adapted to be operated from an automotive tractor vehicle having a fluid operated brake system, comprising, a fluid pressure cylinder, a conduit leading from said cylinder to the brake system of said trailer vehicle for conducting fluid under pressure thereto to apply the brakes to said trailer vehicle, a plunger movable in said cylinder, an actuating means for said plunger, a control device comprising a control plunger and ports controlled thereby, connections between said ports and said actuating means for controlling said means, a second fluid pressure cylinder, a second plunger therein actuated by the operator of said trailer vehicle to apply the brakes therein, a connection between said second pressure cylinder and said control device to move said control plunger in one direction to actuate said actuating means and first mentioned plunger, and a connection between said first mentioned cylinder and said control device to move said control plunger in the opposite direction whereby said control plunger is held in a central position with said brakes on said trailer applied.

8. A brake system for a trailer vehicle adapted to be operated from an automotive tractor vehicle having a fluid operated brake system and a brake applying means, comprising, a power cylinder, spaced pistons therein actuated to move in unison, a fluid pressure cylinder, a plunger movable in said latter cylinder and connected to said pistons to be moved thereby, a conduit extending from said pressure cylinder to the brake system of said trailer vehicle for conducting fluid thereto to apply the brakes to said trailer vehicle, a control device, conduits extending from the ends of said power cylinder respectively to said control device a, connection from the intake manifold of said automotive vehicle to said power cylinder between said pistons, a conduit extending from said power cylinder between said pistons to said control device, a control plunger in said control device having ports for effecting and shutting off communication between said conduits, means normally holding said control plunger in position to apply atmospheric pressure to one end of said power cylinder and reduced pressure to the other end thereof through said conduits, means for actuating said control device from the brake applying means of said automotive vehicle for applying atmospheric pressure to said other end of said power cylinder and reduced pressure to said one end of said power cylinder to move said pistons and plunger and apply fluid pressure through said first mentioned conduit to apply the brakes to said trailer vehicle.

9. A brake system for a trailer vehicle adapted to be operated from an automotive tractor vehicle having a fluid operated brake system, comprising, a fluid pressure cylinder, a conduit leading from said cylinder to the brake system of said trailer vehicle for conducting fluid under pressure thereto to apply the brakes to said trailer vehicle, a plunger movable in said cylinder, an actuating means for said plunger, a fluid pressure means actuated by the operator of said tractor vehicle for applying the brakes to said trailer vehicle, a fluid operated control device for said actuating means, a connection between said control device and said last mentioned means through which said control device is moved to operate said actuating means to operate said first mentioned plunger and apply the brakes to said trailer and a connection between said control device and first mentioned cylinder for moving said control device in the opposite direction until the pressure in said first mentioned connection is balanced and to stop further operation of said actuating means until more pressure is applied by the operator to said fluid pressure means.

10. A brake system for a trailer vehicle adapted to be operated from an automotive tractor vehicle having a fluid operated brake system and a brake operating means comprising a power cylinder having spaced pistons therein connected to move in unison, a fluid pressure cylinder, a plunger secured to said pistons and movable in said fluid pressure cylinder, a conduit extending from said fluid pressure cylinder to the brake system of said second vehicle, a control device, a second conduit extending from one end of said power cylinder to said device, a third conduit extending from the other end of said power cylinder to said device, a fourth conduit extending from said power cylinder between said pistons to said device, a fifth conduit extending from said cylinder between said pistons to the intake manifold of said automotive vehicle, means for holding said device in position with atmospheric pressure applied to one end of said power cylinder through said second conduit and reduced pressure applied to the other end of said power cylinder through said third conduit and means connecting said device to said brake operating means of said automotive vehicle for moving said device for applying atmospheric pressure to said other end of said power cylinder through said third conduit and reduced pressure to the opposite end of said power cylinder through said second conduit to move said plunger and force fluid through said first mentioned conduit to apply the brakes to said trailer vehicle.

11. A brake system for a trailer vehicle adapted to be operated from an automotive tractor vehicle comprising a fluid pressure cylinder, a conduit leading from said cylinder to the brake system of said trailer vehicle for conducting fluid under pressure thereto to apply the brakes to said trailer vehicle, a plunger movable in said cylinder, a control device, a plunger actuating means, a plurality of conduits leading respectively to said control device and plunger actuating means, a connection between said plunger actuating means and the intake manifold of said automotive vehicle, means for holding said control device in position with atmospheric pressure and reduced pressure applied to said plunger actuating means to hold said plunger in brake releasing position, means for actuating said control device for reversing the application of atmospheric pressure and reduced pressure to said plunger actuating means to move said plunger and apply the brakes to said trailer vehicle and an equalizing connection between said fluid pressure cylinder and said control device.

12. A brake system for a trailer vehicle adapted to be operated from an automotive tractor vehicle having a fluid operated brake system and a brake applying means, comprising, a conduit extending to the brake mechanism of said trailer vehicle for conducting fluid under pressure thereto to apply the brakes, means for forcing fluid under pressure through said conduit, means for holding said last mentioned means in brake releasing position, means actuated by the brake applying means of said automotive vehicle for operating said first mentioned means to apply the brakes on said trailer when said brakes are applied on said automotive vehicle and means for also operating said first mentioned means to apply the brakes on said trailer without operating the brakes on said automotive vehicle.

13. A brake system for a trailer vehicle adapted to be operated from an automotive tractor vehicle having a fluid operated brake system, comprising, a fluid pressure cylinder, a conduit leading from said cylinder to the brake system of said trailer vehicle for conducting fluid under pressure thereto to apply the brakes to said trailer vehicle, a plunger movable in said cylinder, a control device for said plunger, a second control device for said plunger, means actuated by the brake applying means of said automotive vehicle to operate said second control device to cause movement of said plunger to apply the brakes on said trailer when the brakes on said automotive vehicle are applied and means for actuating said first mentioned control device to move said plunger to apply the brakes on said trailer without applying the brakes on said automotive vehicle.

14. A brake system for a trailer vehicle adapted to be operated from an automotive tractor vehicle having a fluid operated brake system and brake applying means, comprising, a fluid pressure cylinder, a conduit leading from said cylinder to the brake system of said trailer vehicle for conducting fluid under pressure thereto to apply the brakes to said trailer vehicle, a plunger movable in said cylinder, means actuated by the brake applying means of said automotive vehicle for forcing fluid through said conduit to apply the brakes on the trailer when the brakes are applied on said automotive vehicle, and means for controlling the flow of fluid through said conduit to apply the brakes on said trailer without applying the brakes on said automotive vehicle.

15. A control device for the brake mechanism of a vehicle comprising a conduit through which fluid is forced, a second conduit for conducting said fluid to the brake operating mechanism of said vehicle, a member having a bore therein to which said conduits are connected, a plunger movable in said bore having a passage therethrough with spaced ports leading therefrom, and means for moving said plunger into position with said passage and ports connecting said conduits so that the brakes may be operated and for moving said plunger to a position with said ports covered and preventing communication between said conduits so that no fluid can be forced through said second conduit.

16. A control device for a brake mechanism having in combination, a casing having a bore therein, a conduit connected to said casing and communicating with said bore adapted to supply fluid under pressure thereto, a second conduit communicating with said bore and extending to the brake operated mechanism of said vehicle, said bore having enlarged portions with which said conduits respectively communicate, said plunger having a passage extending longitudinally therein with outlets at its ends and means for moving said plunger into position with said outlets aligned with said enlarged portions of said bore whereby fluid can pass from said first mentioned conduit to said second conduit and for moving said plunger to a position with said outlets closed by the walls of said bore so that communication between said conduits is prevented.

17. A brake system for a trailer vehicle adapted to be operated from an automotive vehicle having a fluid operated brake system and a brake applying means including a fluid cylinder and piston therein, said piston being moved by the operator, comprising, a conduit extending to the brake mechanism of said trailer vehicle for conducting fluid under pressure thereto to apply the brakes, a cylinder for containing fluid with which said conduit connects, a plunger in said cylinder for forcing fluid through said conduit, a control device for said plunger including a cylinder and a plunger therein, said cylinder having a plurality of ports controlled by parts of said plunger, a connection between said brake applying cylinder and said cylinder of said control device for actuating the plunger of said control device and a connection between said first mentioned cylinder and the cylinder of said control device for effecting a balance or equalization of the fluid in said cylinder for holding said plunger in certain positions.

18. A brake system for a trailer vehicle adapted to be operated from an automotive tractor vehicle having a fluid operated brake system and an internal combustion motor comprising, a fluid pressure cylinder, a plunger movable therein, a conduit leading from said cylinder to the brake mechanism of said trailer for conducting fluid under pressure to said mechanism for applying the brakes, an actuating means for said plunger comprising a cylinder and plunger, a valve control device for said actuating means, a plurality of conduits connecting said control device and actuating means, a cylinder and piston structure actuated by the operator for actuating said control device and a conduit connecting said structure and said control device.

ROY CORWIN HOYT.